United States Patent [19]

Berthold et al.

[11] Patent Number: 5,196,694
[45] Date of Patent: Mar. 23, 1993

[54] TEMPERATURE COMPENSATED SELF-REFERENCED FIBER OPTIC MICROBEND PRESSURE TRANSDUCER

[75] Inventors: John W. Berthold, Salem; Stuart E. Reed, Homeworth, both of Ohio

[73] Assignee: The Babcock & Wilcox Company, New Orleans, La.

[21] Appl. No.: 700,387

[22] Filed: May 13, 1991

[51] Int. Cl.$^5$ .............................................. H01J 5/16
[52] U.S. Cl. ........................... 250/227.16; 250/231.19
[58] Field of Search ...................... 250/227.16, 227.21, 250/227.23, 227.19, 227.14, 231.19, 227.15; 73/705, 800, 653

[56] References Cited

U.S. PATENT DOCUMENTS

| | | | |
|---|---|---|---|
| 4,436,995 | 3/1984 | Whitten | 250/227 |
| 4,487,206 | 12/1984 | Aagard | 128/667 |
| 4,500,204 | 2/1985 | Ogura | 356/318 |
| 4,577,100 | 3/1986 | Meitz et al. | 250/231 |
| 4,589,286 | 5/1986 | Berthold, III | 73/715 |
| 4,600,836 | 7/1986 | Berthold, III et al. | 250/231 |
| 4,681,395 | 7/1987 | Lindsay et al. | 350/96.16 |
| 4,703,175 | 10/1987 | Salour et al. | 250/227.16 |
| 4,714,829 | 12/1988 | Hartog et al. | 250/227 |
| 4,724,316 | 2/1988 | Morton | 250/227 |
| 4,733,933 | 3/1988 | Pikulski | 350/96.20 |
| 4,853,534 | 8/1989 | Dakin | 250/227 |
| 4,860,586 | 8/1989 | Miers et al. | 250/227.16 |
| 4,891,511 | 1/1990 | Reed | 250/227 |
| 4,915,468 | 4/1990 | Kim et al. | 350/96.15 |
| 4,930,862 | 6/1990 | Miers et al. | 350/96.29 |
| 4,932,262 | 6/1990 | Wlodarczyk | 73/705 |
| 4,932,263 | 6/1990 | Wlodarczyk | 73/705 |

OTHER PUBLICATIONS

J. W. Berthold, W. L. Ghering, and D. Varshneya, "Calibration of High Temperature Fiber-Optic, Microbend Pressure Transducers", Proc. of SPIE Fiber/Laser '86, Paper No. 718-20, Sep. 1986.

J. W. Berthold, "Industrial Applications of Fiber Optic Sensors", Proc. SPIE 29th International Technical Symposium, Paper No. 566 05, Aug. 1985.

T. G. Giallorenzi, J. A. Bucaro, A. Dandridge, G. H. Siegel, Jr., J. H. Cole, S. C. Rashleigh, and R. G. Priest, "Optical Fiber Sensor Technology", IEEE J. Quantum Electron, vol. Q-E-18 p. 626, 1982.

J. N. Fields and J. H. Cole, "Fiber Microbend Acoustic Sensor", Appl. Opt., vol. 19, p. 3265, 1980.

J. D. Beasley, "Multimode Optical Evanescent-Wave Acoustic Sensor", J. Acoust. Soc. Amer., vol. 68, p. 595, 1980.

C. M. Lawson and V. J. Tekippe, "Fiber Optic Diaphragm-Curvature Pressure Transducer", Opt. Lett., vol. 8, p. 286, 1983.

A. D. Kersey, F. Bucholtz, and A. Dandridge, "Interferometric Sensors for DE Measurands A New Class of Fiber Sensors," Proc. of SPIE Fiber/Laser '86, Paper No. 718-26, Sept. 1986.

(List continued on next page.)

Primary Examiner—David C. Nelms
Assistant Examiner—T. Davenport
Attorney, Agent, or Firm—Daniel S. Kalka; Robert J. Edwards; Vytas R. Matas

[57] ABSTRACT

A temperature compensated, self-referenced fiber optic microbend pressure transducer employs a fiber optic loop (90) to compensate for thermal offset of the microbend sensor output. In the preferred embodiment, time division multiplexing provides at least two bi-cell photodetectors (82) with output and source signals for generating a log ratio output for determining the sensed parameter independent of cable and connector offsets and light source fluctuations in addition to compensation for thermal offset. An alternate embodiment uses time domain intensity referencing.

19 Claims, 14 Drawing Sheets

OTHER PUBLICATONS

L. Jeunhomme and J. P. Pocholle, "Mode Coupling in a Multimode Optical Fiber with Microbends", *Appl. Opt.*, vol. 14, p. 2400, 1975.

N. Lagakos et al, "Multimode Optical Fiber Displacement Sensor," *Appl. Opt.*, vol. 20, p. 167, 1981.

S. Timoshenko, *Theory of Plates and Shells,* New York McGraw-Hill, 1940.

J. W. Berthold, "High Temperature Fiber Optic Pressure Sensor," Proc. of ISA 30th Symposium, p. 85, May 1984.

J. W. Berthold et al, "Design and Characterization of a High Temperature Fiber-Optic Pressure Transducer", *Journal of Lightwave Tech.*, vol. LT-5, No. 7, p. 870, Jul. 1987.

B. Johnson et al, "A Standard Fiber Optic Sensor Interface for Aerospace Applications: Time Domain Intensity Normalization," Paper No. 989-09, SPIE, 1988, Boston.

J. W. Berthold et al., "Simple, Repeatable, Fiber-Optic Intensity Sensor for Temperature Measurement," presented SPIE, Boston, Sep. 1989.

S. R. Reed and J. W. Berthold, "Absolute Fiber Optic Pressure Transducer For Aircraft Air Data Measurement", NAECON, Dayton, Ohio May 20, 1991.

J. N. Fields et al, "Fiber-Optic Hydrophone", vol. 2, Amer. Cer. Soc., Columbus, Ohio, p. 529, 1981.

A. Rogers and R. Weiss, *Primer on Optical Fiber Sensors,* pp. 9-10, 32-33, 35-36, 50-55 and 62-63, Information Gatekeepers Inc. 1989.

McDonnell Douglas Corp., subcontract to design-/develop, Z00049, for NASA Contract, NA53-23712, Mar. 27, 1990.

Diagram of Fiber Optic Pressure Transducer Arranged for Installation in a 3000psi Pipeline

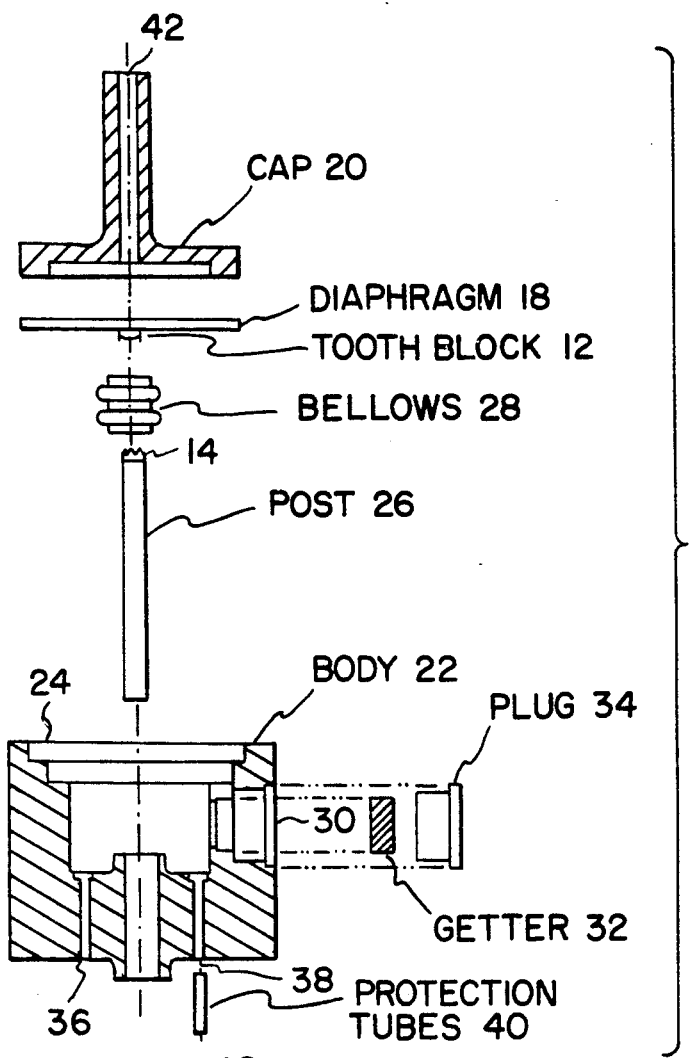
FIG. 2a
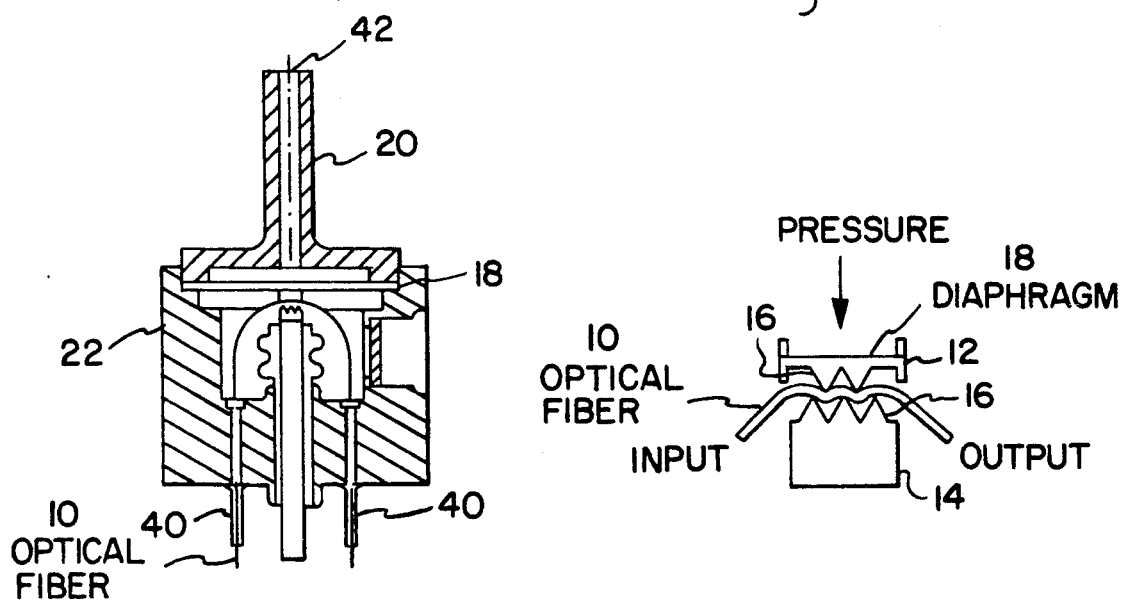
FIG. 2b
FIG. 3

Measured microbend sensor output voltage versus displacement at ambient temperature Calculated diaphragm deflection versus pressure with 27 N point load at center of diaphragm

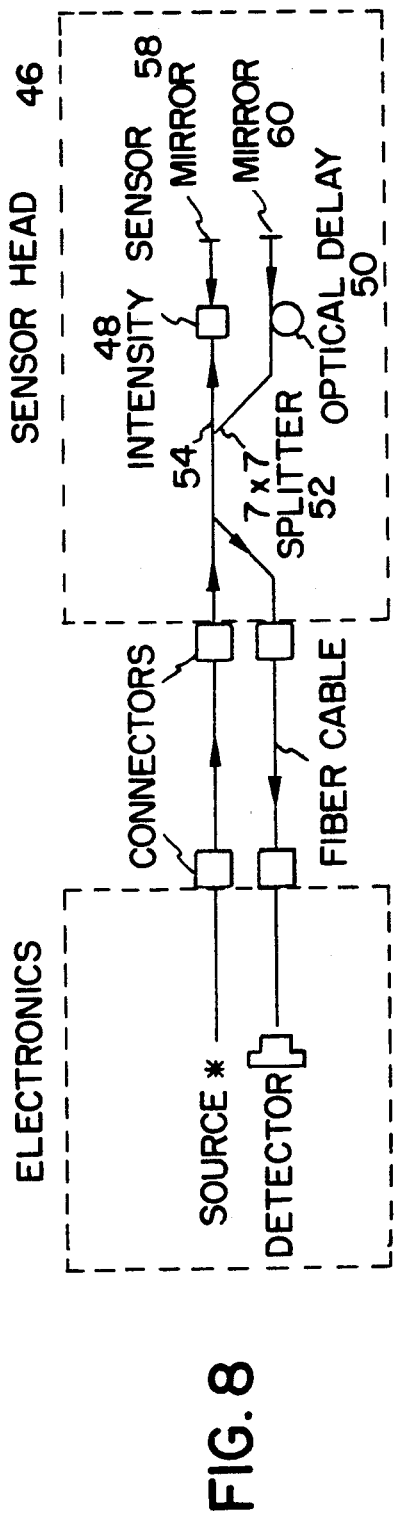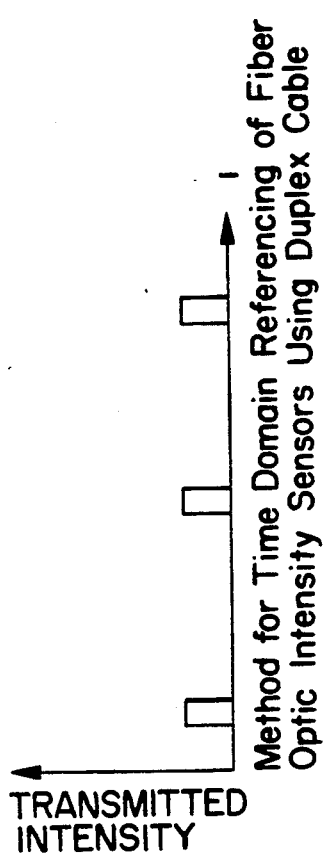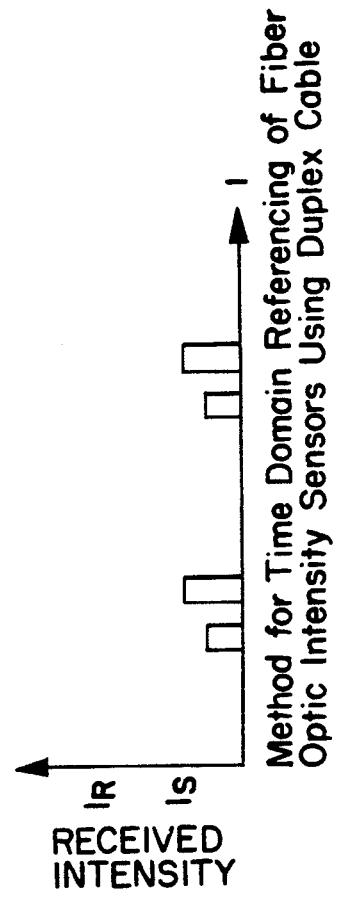
FIG. 8
FIG. 9a
FIG. 9b

Method for Wavelength Referencing of Fiber Optic Intensity Sensors

Fiber Loop Temperature Sensor

FIBER LOOP #1 (3db)

FIBER LOOP #2 (1.5db)

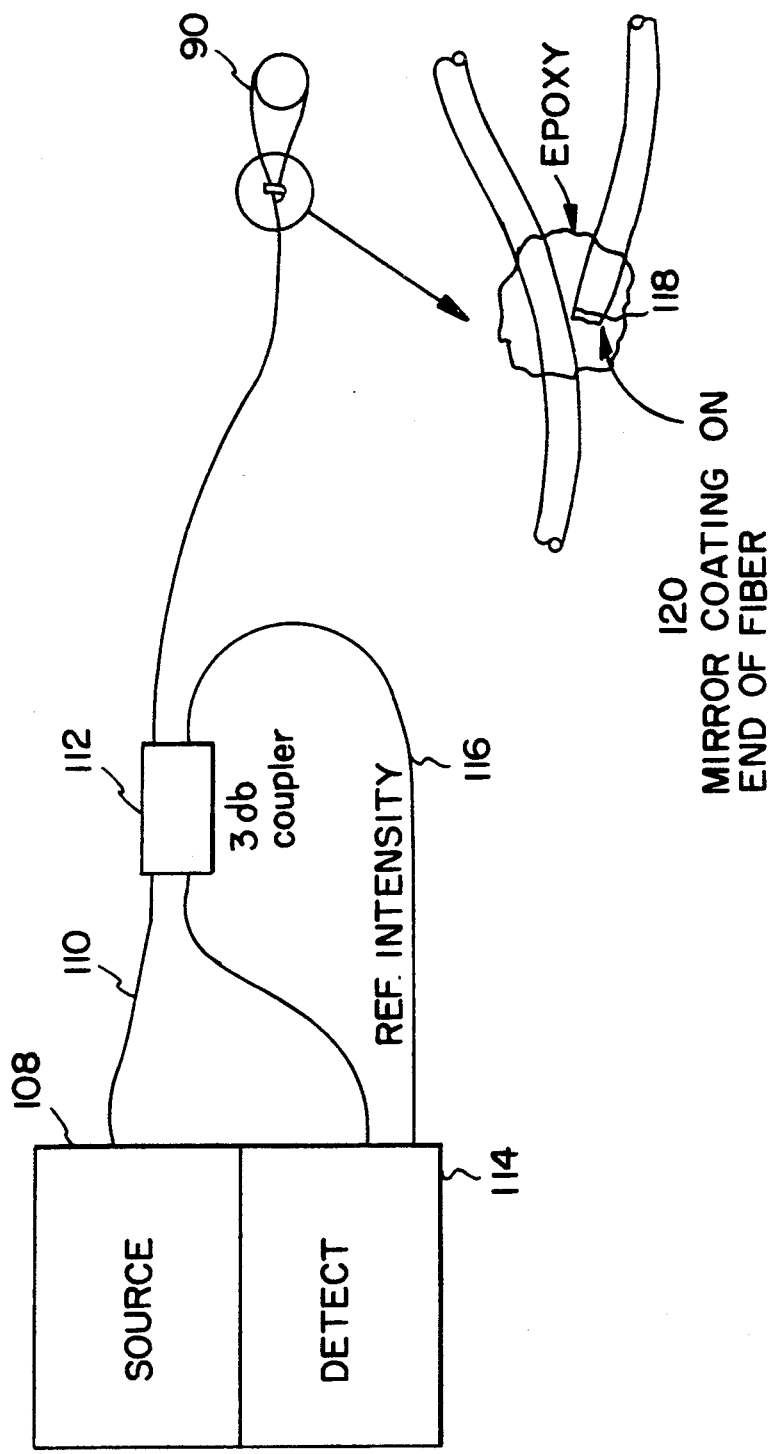

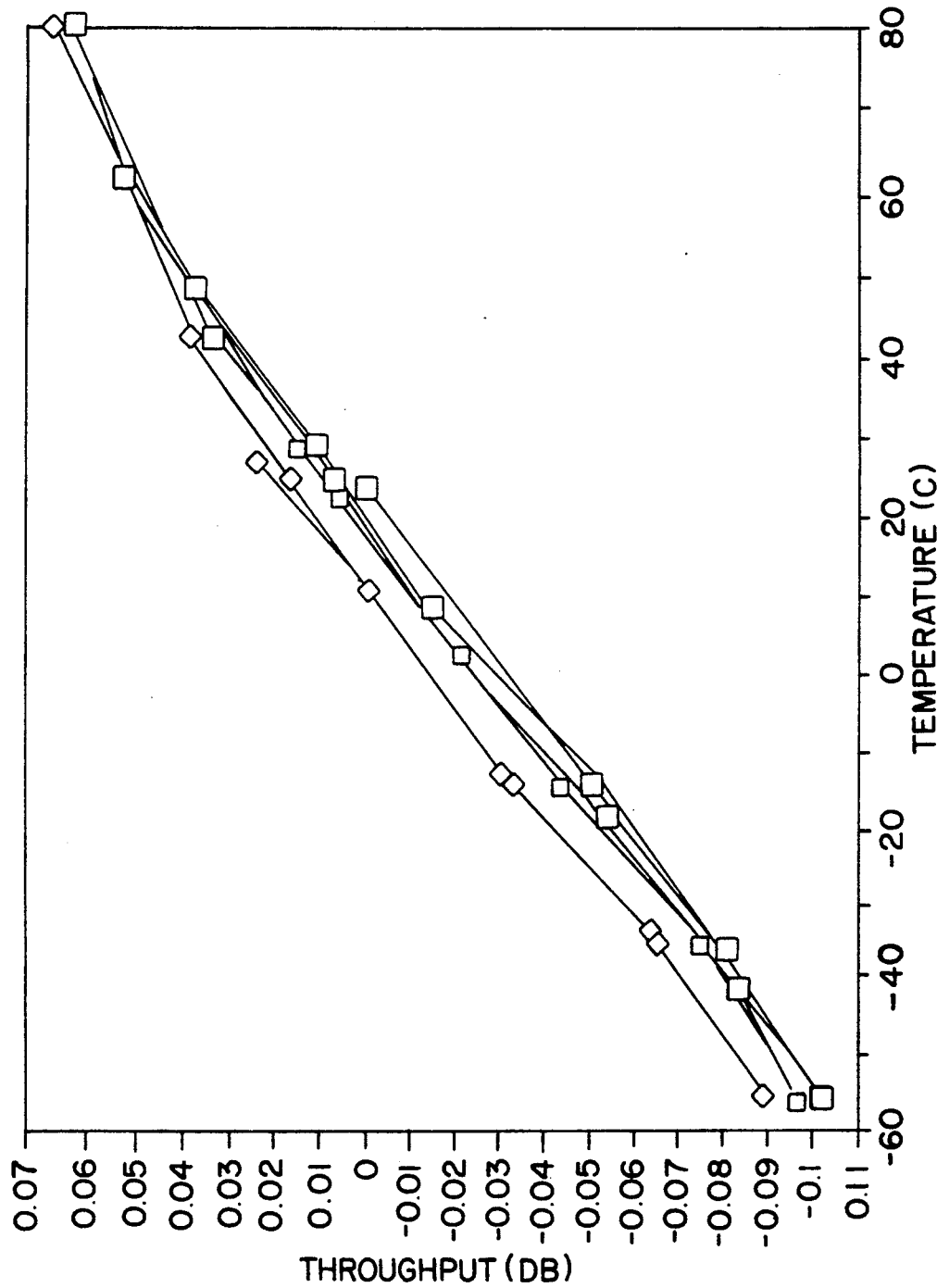

Fiber optic microbend pressure transducer response data

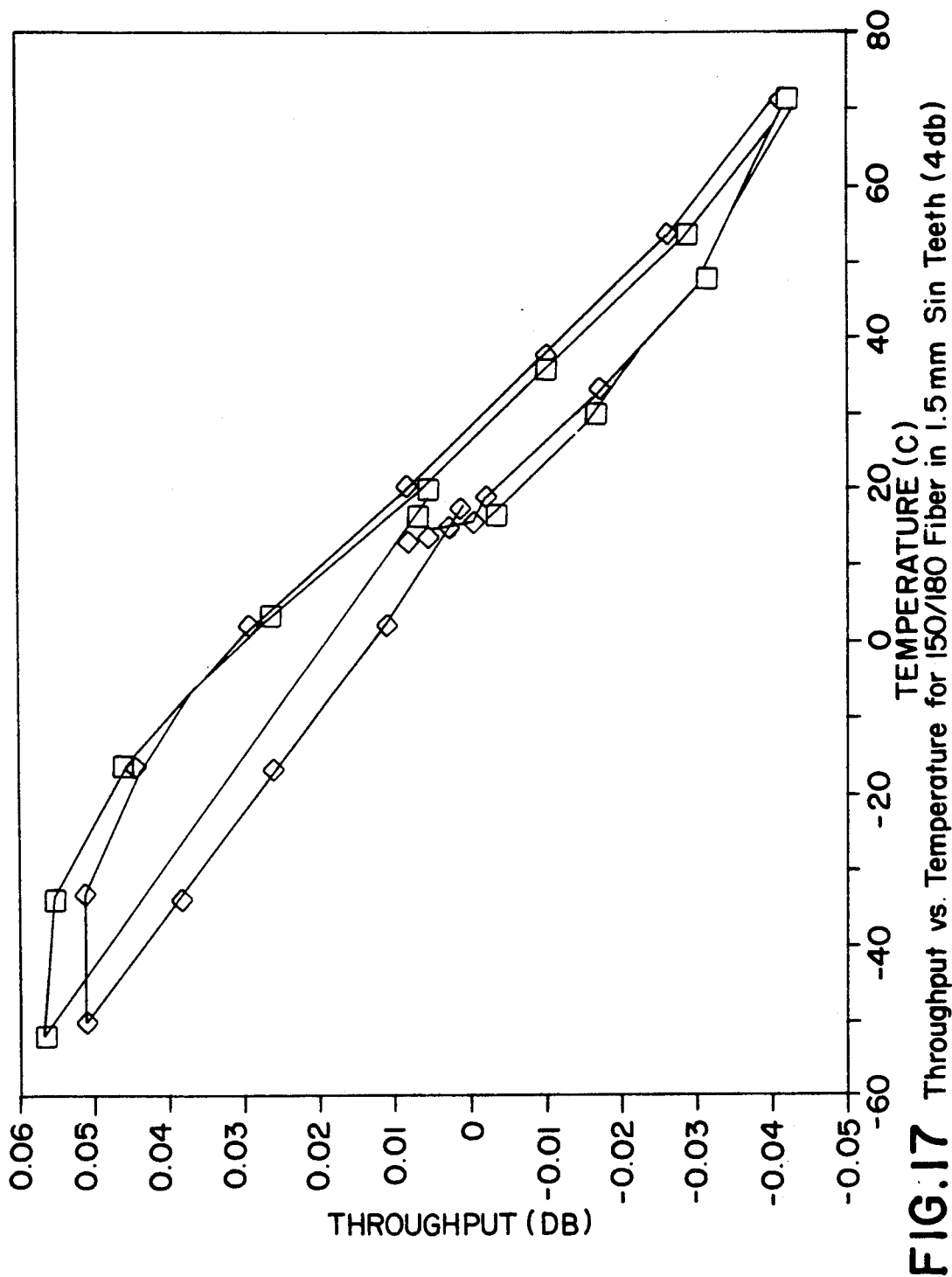
FIG. 17 Throughput vs. Temperature for 150/180 Fiber in 1.5mm Sin Teeth (4db)

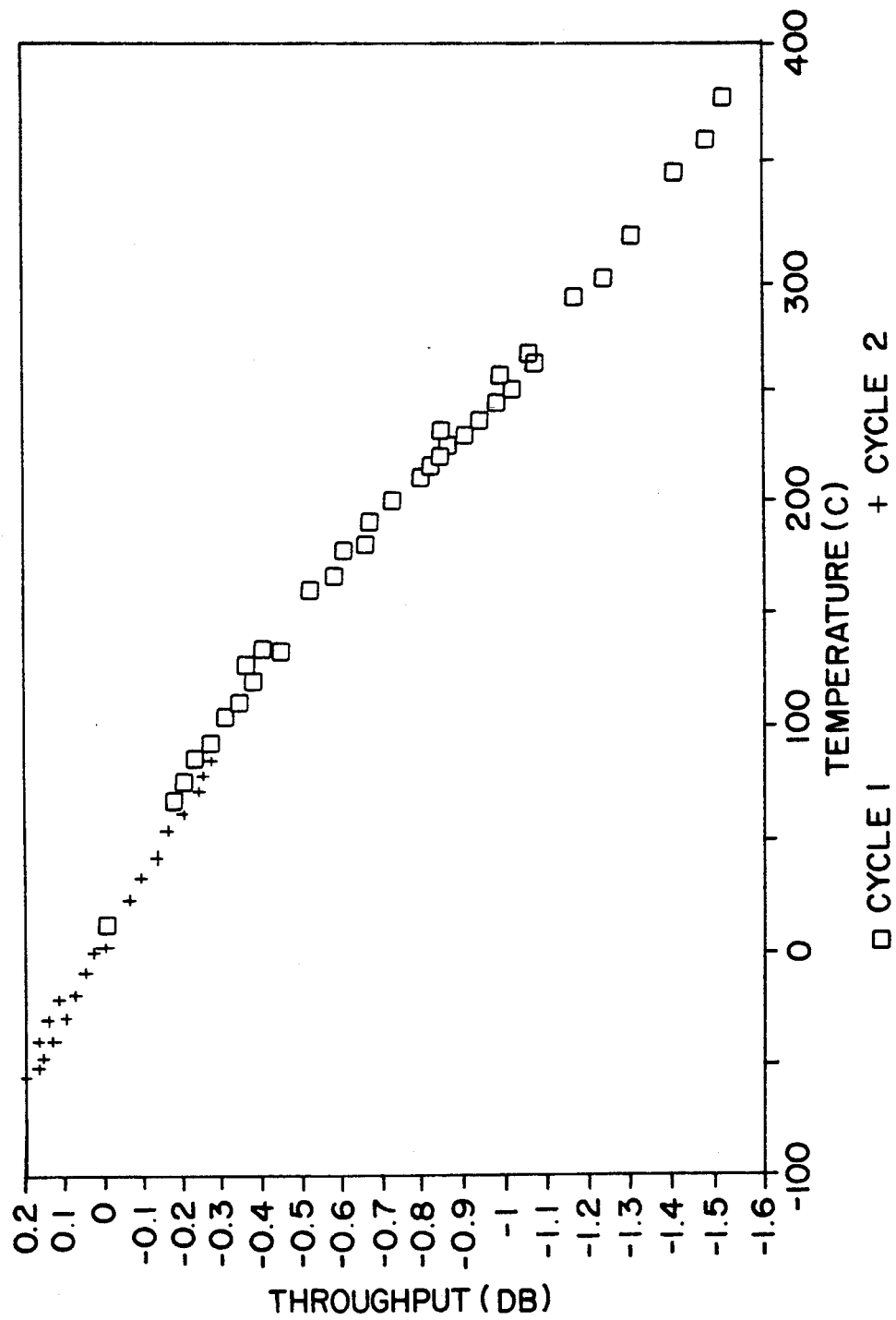

TEMPERATURE COMPENSATED SELF-REFERENCED FIBER OPTIC MICROBEND PRESSURE TRANSDUCER

This invention was made with Government support under Contract No. NAS3-25796 awarded by the National Aeronautics and Space Administration. The Government has certain rights in this invention.

BACKGROUND OF THE INVENTION

1. Field of the Invention

The present invention relates in general, to fiber optic sensors, and in particular, to a temperature compensated self-referenced fiber optic microbend pressure transducer.

2. Description of the Related Art

Numerous applications exist for pressure measurement in high-temperature environments. These applications include pipe line pressure in petrochemical refineries, gas path pressure in aircraft engines and main steamline pressure in turbine generators. Traditional diaphragm type pressure transducers are not suited for these high-temperature applications for several reasons. First, the diaphragm material may creep and cause output offset error. Second, the strain or capacitance gages used to measure diaphragm deflection exhibit large non-repeatable and unpredictable changes in gauge outputs at temperatures greater than 300° C. These changes are caused by such effects as alloy segregation, phase changes, selective oxidation, and diffusion. Ultimately, they lead to premature failure of the gage or lead-wire.

One attempt to eliminate the effects of diaphragm creep and hysteresis used dimensionally stable fused silica or other ceramic for the diaphragm material. Another attempt to enable measurement of diaphragm deflection at high temperatures employed fiber optic sensors with a fused silica optical fiber.

While there are several fiber optic sensors available for sensing diaphragm deflection, most of these sensors have been configured for dynamic applications such as the detection of acoustic signals. Since pressure changes occur over long periods of time in most process applications, pressure transducers and manometers must be designed to measure static or dc pressure. Consequently, it is desirable that these devices have low drift and insensitivity to environmental changes other than pressure, for example, temperature.

In addition, there are practical problems associated with the design of fiber optic sensors to operate at elevated temperatures with adequate sensitivity within a transducer configuration exhibiting low drift and environmental insensitivity.

Microbend sensors exhibit zero offset as a function of temperature. The zero offset causes an apparent error in applications such as pressure transducers where the fiber optic microbend sensor is used to measure diaphragm deflection. It is known that microbend sensor offset is a linear, repeatable function of temperature. Thus, it is desirable that an independent, linear fiber optic measurement of temperature provide a signal which could be subtracted from the microbend sensor to provide a simple method for compensation of temperature offset.

SUMMARY OF THE INVENTION

The present invention solves the aforementioned problems with the prior art as well as others by providing a temperature compensated, self-referenced fiber optic sensor.

The temperature compensated, self-referenced fiber optic sensor comprises a pair of plates with corrugated surfaces having facing and offsetting teeth. At least one of the plates is in contact with a parameter to be sensed or measured. A signal optical fiber is clamped between the corrugated plates so that when the parameter applies a force thereon, it causes a change in separation of the plates and microbending of the signal fiber. At least one reference optical fiber is located in a similar environment to be exposed to the same conditions. The reference optical fiber is formed in a loop with a predetermined radius to compensate for thermal offset. A light source supplies light to the fibers and optical detecting means receives the light and measures the changes in light intensity for determining the sensed parameter. The change in light transmission in the reference fiber compensates for thermal offset in the sensed parameter.

One embodiment of the present invention employs wavelength division multiplexing where light at two different wavelengths is propagated through a common fiber and then separated so that one wavelength is propagated through the sensor fiber and the other wavelength through the reference fiber. After passing through the sensor, the light is combined in an output fiber and later separated at the optical detecting means. The optical detecting means includes photodetectors for comparing light intensities of the two wavelengths with source signals directly from the light source.

The preferred embodiment of the present invention uses time domain intensity normalization. In this embodiment the reference fiber includes a delay line to create a separation in time between light intensity pulses traveling in the sensor and reference fibers.

The present invention advantageously employs a first optic loop for temperature compensation. The fiber optic loop may be incorporated directly in the reference fiber or it may be serially connected to the sensor optical fiber so that the slope change due to temperature compensates the slope of thermal offset in the microbend sensor.

Accordingly, one aspect of the present invention is to provide an optical fiber loop temperature sensor to compensate for thermal offset.

Another aspect of the present invention is to provide a temperature compensated, self-referenced fiber optic sensor.

Still another aspect of the present invention is to provide a temperature compensated self-referenced fiber optic microbend pressure transducer.

A further aspect of the present invention is to provide a fiber optic sensor which is simple in design, rugged in construction, and economical to manufacture.

The various features of novelty which characterize the present invention are pointed out with particularity in the claims annexed to and forming a part of this disclosure. For a better understanding of the present invention, its operating advantages and specific objects attained by its use, reference is made to the accompanying drawings and descriptive matter in which the preferred embodiments of the invention are illustrated.

BRIEF DESCRIPTION OF THE DRAWINGS

FIG. 2(a) is an exploded cross-sectional view of the preferred embodiment of a temperature compensated, self-referenced fiber optic pressure transducer;

FIG. 2(b) is an assembled view of FIG. 2(a);

FIG. 3 is a close-up view of the microbend sensor employed in FIGS. 1, 2(a) and 2(b);

FIG. 8 is a schematic representation of an embodiment of the present invention employing time domain referencing;

FIGS. 9(a) and 9(b) are graphs showing transmitted intensity and received intensity employing time domain referencing;

FIG. 14 depicts a single ended fiber optic loop;

FIG. 15 is a calibration curve for a 4.8 dB loop;

FIG. 17 is a plot of throughput (dB) versus temperature over the temperature range of −60° C. to 80° C.; and FIG. 18 is a calibration curve for a silicon etalon temperature sensor.

DESCRIPTION OF THE PREFERRED EMBODIMENTS

Figure 1:
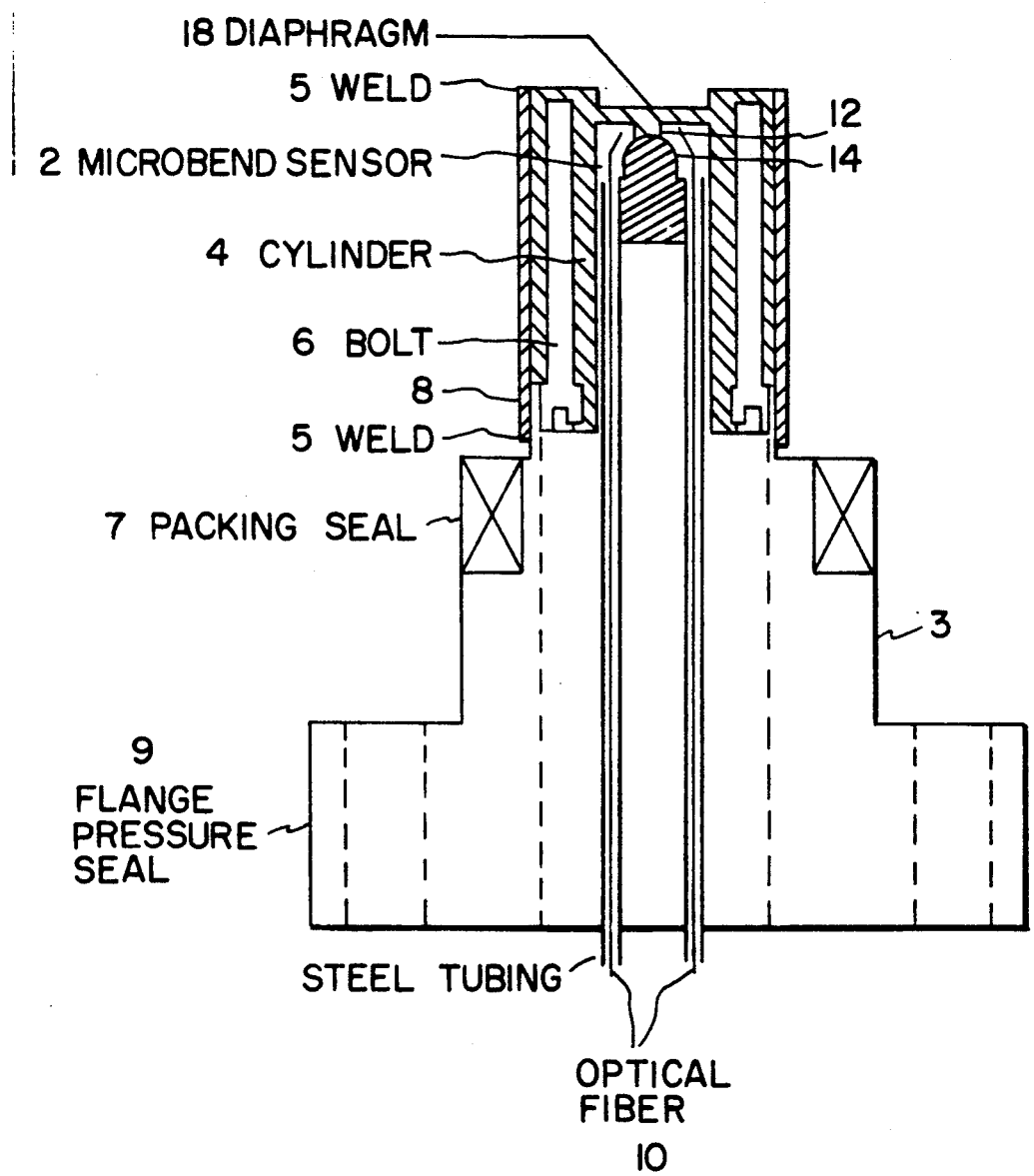
FIG. 1 is a sectional view of a fiber optic pressure transducer.

Referring to the drawings, and FIG. 1 in particular, there is shown a diaphragm pressure transducer containing a fiber optic microbend sensor (2). These transducers use a microbend fiber optic sensing principle where a multimode step-index optical fiber (10) with a buffer coating is squeezed between a pair of plates (12, 14) with corrugated surfaces having facing and offsetting teeth (16). One of the plates (12) is positioned approximately at the center of a diaphragm (18) which deflects in proportion to a pressure exerted upon it. This deflection causes a change in the amplitude for the periodic distortion of the optical fiber (10) squeezed between plates (12, 14). Optical light transmitted through the optical fiber (10) is attenuated in proportion to the amplitude of these mechanical distortions (microbends).

Thus, measurement of the change in transmitted light provides a signal proportional to pressure applied to the diaphragm (18).

In FIG. 1, the transducer consists of a 1.4 mm. thick, 12.7 mm. diameter diaphragm (18) fastened to a cylinder (4) with bolts (6). The cylinder (4) is fastened to a flange (3) by welds (5). This assembly is designed to be inserted directly into a high pressure pipeline (not shown) which contains a mating flange. Pressure seals (7, 9) ensure a tight fit. The transducer diaphragm (18) and cylinder (4) are made from a high strength steel super alloy such as Inconel (a Registered Trademark of The International Nickel Company, Inc.). This alloy is chosen because of its low creep at high temperatures and the relative ease in machining this material compared to fused silica.

Next, referring to FIG. 2, there is shown another embodiment of the microbend pressure transducer.

Diaphragm (18) is sealed around its circumference by suitable means such as an electron beam weld to a cap (20) and a body (22). The body (22) has a step-bored cavity (24) for receiving the diaphragm (18), and the second plate (14) which may be affixed by any suitable means such as a post (26) with bellows (28) circumferentially surrounding the post (26) immediately below plate (14). A second aperture (30) in the side of the body (22) in communication with the first aperture (24) allows for a getter (32) and a plug (34). Openings (36, 38) allow the optical fiber to enter the body (22) and are sealed with Torr Seal vacuum epoxy commercially available through Varian Associates. Protection tubes (40) may be employed to protect and secure optical fiber (10) as it enters the body (22). An opening (42) in cap (20) allows introduction of the unknown pressure to the assembled transducer. The volume surrounding the microbend sensor and bellows is evacuated to create a vacuum with opening (30) being plugged thereafter. The getter (32) absorbs outgassed and in-diffused gases to ensure that a vacuum reference is maintained for extended time periods behind the diaphragm (18). This embodiment provides an absolute pressure reference.

The multi-mode step index optical signal fiber (10) is clamped between a pair of plates (12, 14) as best seen in FIG. 3. The first plate (12) is located at approximately the diaphragm (18) center and the second plate (14) is positioned on a fixed reference surface of the transducer body such as post (26). When a pressure is applied to the flexible diaphragm (18), the optical fiber (10) is spatially deformed into a sinusoidal shape. The deformation induces loss in the optical fiber (10) proportional to an applied pressure. The loss sensitivity may be optimized by matching the sinusoidal deformation period to the difference between the propagation constants of adjacent modes in the optical fiber (10). The power loss from the core to radiation modes is optimum when the fiber spatial-bend frequency equals the difference in propagation constants ($\Delta B$) between propagating and radiation modes as follows:

$$\Delta \beta = \pm \frac{2\pi}{\Lambda} \qquad (1)$$

where: $\Lambda$ is the corrugation spacing. For step index fibers, $\Delta \beta$ is given by the following formula:

$$\Delta \beta = \beta_{m+1} - \beta_m = \frac{2\Delta^{\frac{1}{2}}}{a} \frac{m}{M} \qquad (2)$$

where:
a = the fiber core radius m = the mode number
M = the total number of modes
Δ = (n$_{core}$ − n$_{clad}$)/n$_{clad}$ The higher-order modes are preferentially coupled to adjacent higher-order modes and radiation modes by the periodic distortion applied to the fiber by the corrugations. For these higher-order modes the mode number is about equal to the total number of modes, and by combining Equations, 1 and 2, the optimum corrugation spacing is calculated as follows for a fiber with 0.15 mm core and 0.18 mm clad diameters.

$$\Lambda = \frac{\pi a}{\Delta^{\frac{1}{2}}} = 2.4 \text{ mm} \quad (3)$$

Figure 4:
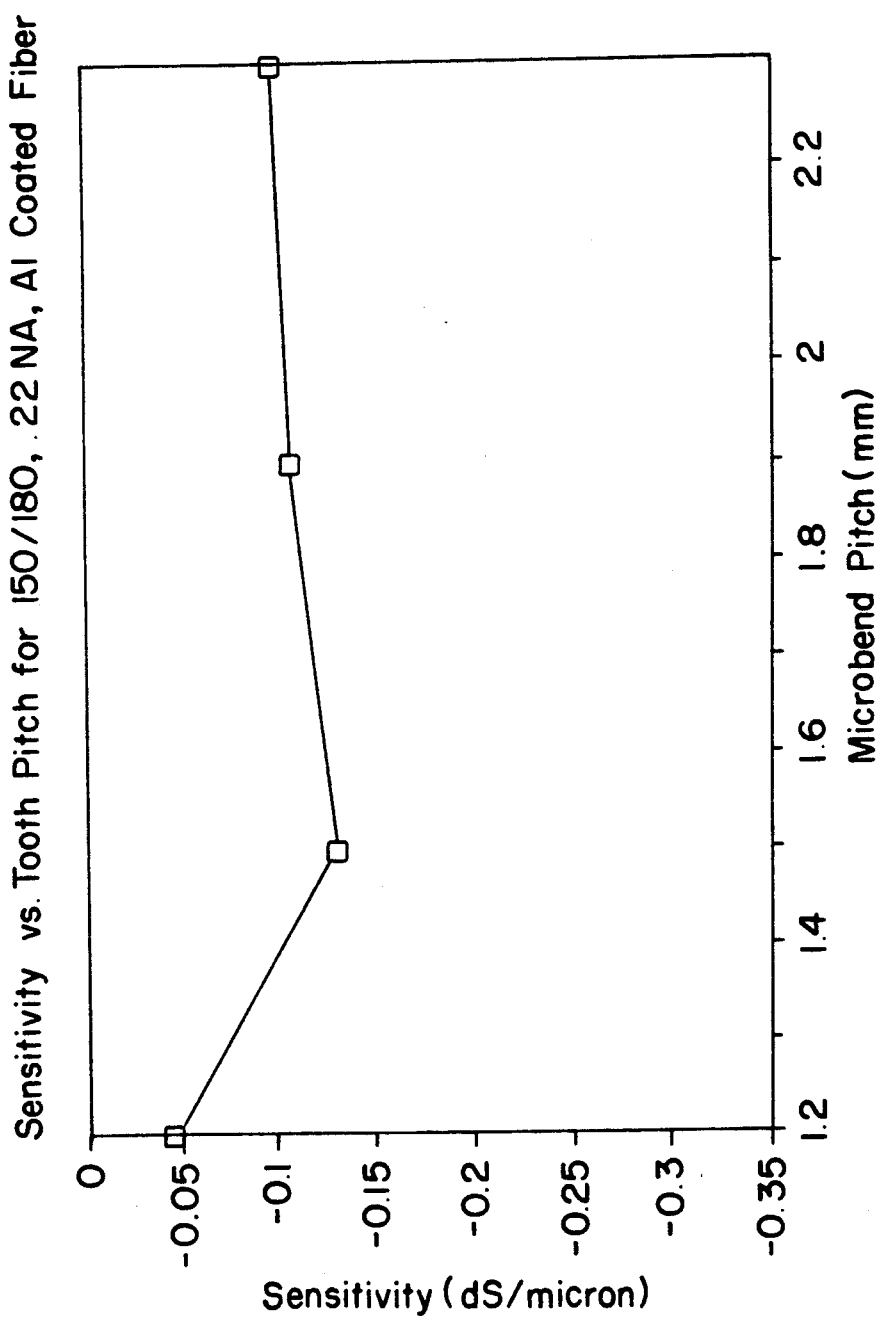
FIG. 4 is a graph of sensitivity versus tooth pitch illustrating optimum corrugation spacing.

Although the result in Equation 3 is close to the optimum value, the corrugation spacing providing best sensitivity for a 0.15 mm core diameter fiber has been found to be about 0.15 mm, as shown in FIG. 4.

Figure 5:
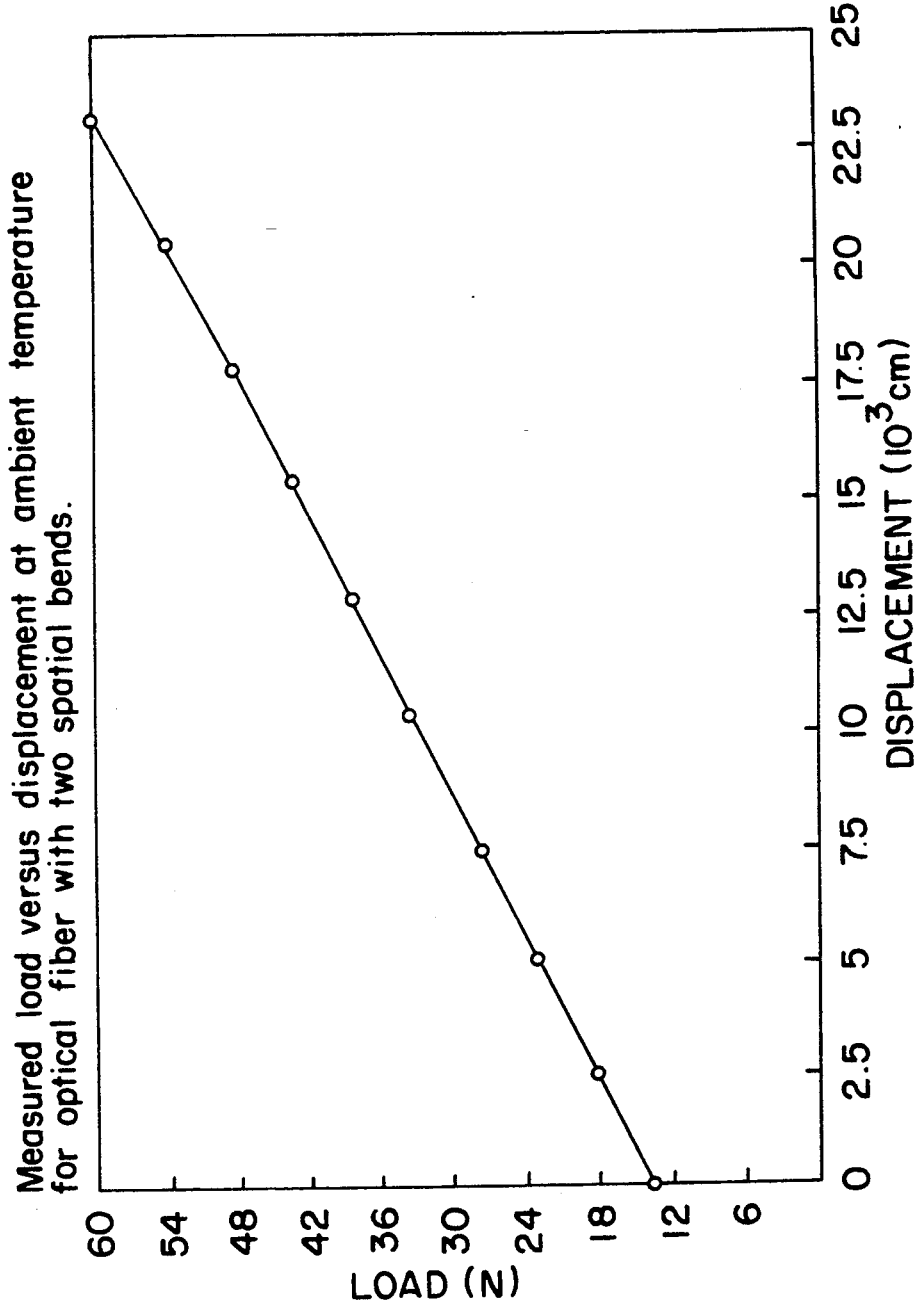
FIG. 5 is a graph of applied load versus displacement using corrugated sensor plates.

FIG. 5 shows the applied load versus displacement measured using corrugated sensor plates that apply two spatial bends to the optical fiber. The spring constant is the slope of the curve in FIG. 5. For small changes, the displacement changes linearly with load.

Figure 6:
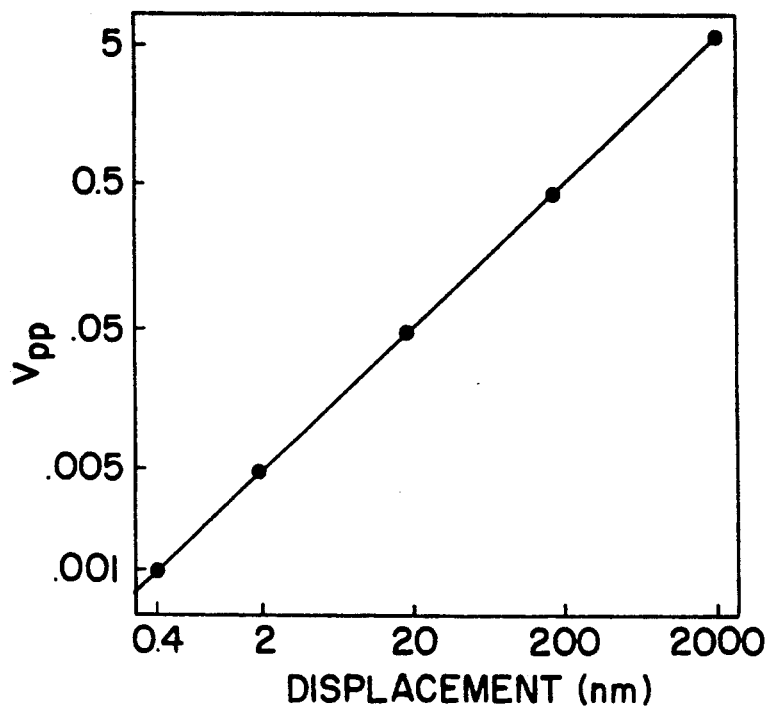
FIG. 6 is a graph of measured microbend sensor output voltage versus displacement at ambient temperature.

FIG. 6 plots the inverted sensor output voltage signal versus displacement. The electronics bandwidth employed was 100 Hz. This microbend sensor calibration curve was generated using a piezoelectric transducer (PZT) (driven at 100 Hz) and corrugated plates similar to those in the sensor. The PZT was in turn calibrated using a Brown and Sharpe displacement gage whose calibration is traceable to the National Bureau of Standards. The piezoelectric transducer retracts with applied voltage at 20 nm/volt. It is apparent from FIG. 6 that the microbend sensor output signal is linear with displacement over almost four orders of magnitude. The plotted signal voltage is directly proportional to light intensity transmitted through the optical fiber squeezed between the corrugated plates (12, 14).

Figure 7:
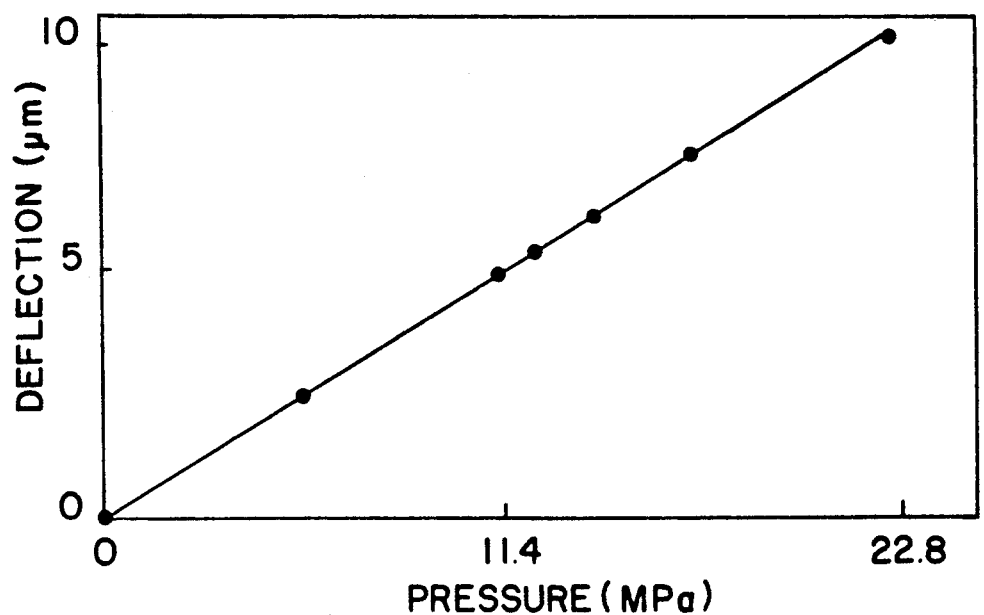
FIG. 7 is a graph of calculated diagram deflection versus pressure with 27N point load at center of diaphragm.

The graph in FIG. 7 is the calculated deflection of a 12.7 mm diameter, 1.4 mm thick diaphragm (18) versus applied pressure with a 27N point load at the diaphragm center. The 27N point load is a non-critical value and represents a typical preload on the optical fiber (10). The calculation represents the configuration diagrammed in FIG. 1. The deflection $W_T$ is given by the following formula:

$$W_T = \frac{1 - \mu^2}{Et^3} \left[ \frac{qa2}{16} + \frac{Q}{4\pi} \right] 3a^2 \quad (4)$$

where:
μ = Poisson's ratio
E = Young's modulus
t = diaphragm thickness
a = diaphragm radius
q = pressure load Q is the force due to compression of the optical fiber with a preload ($L_o$=27N) according to the following equation:

$$Q = -[(W_T - W')K + L_o] \quad (5)$$

where:
K = fiber spring constant
W' = diaphragm deflection at q=0

FIGS. 4–7 provide sufficient information to analyze and predict the performance of the microbend sensor with the following assumptions:
a) two periodic distortions of fiber;
b) spring constant as calculated from FIG. 5;
c) a light-emitting diode light sensor with a nominal output wavelength of 830 nm;
d) 100 μW of optical power ($P_o$) propagating in unloaded fiber;
e) 27N static load ($L_o$) on fiber at diaphragm center; and
f) 53% static light transmission ($T_o$) caused by static load.

The values of preload and quiescent light transmission are noncritical because of the extremely wide sensor linearity range (see FIGS. 5 and 6). These values chosen for calculation below are typical, but vary with machining tolerances on transducer parts and mating surfaces. Since the light transmission, T, is log linear with displacement, Δh (FIG. 6), and the displacement is linear with applied pressure, q (FIG. 7), the light transmission is log linear with applied pressure. The change in light transmission, ΔT, with displacement is expressed as follows:

$$\frac{\Delta T}{T_o} = \frac{\Delta h K}{L_o} \quad (6)$$

From FIG. 7, deflection Δh is 10 μm at 22.8 MPa full-scale pressure, and resolves 0.1% of full scale in a 1 Hz electrical bandwidth. This corresponds to a minimum detectable displacement of 10 nm. Substituting the appropriate value into Equation 6, as follows:

$$\frac{\Delta T}{T_o} = \frac{(10^{-6} \text{ cm})(1800 \text{ N/cm})}{27 \text{ N}} \quad (7)$$
$$= 6.6 \times 10^{-5}$$

The static load causes a static loss in optical power (P) given by:

$$P = P_o T_o = 53 \ \mu W \quad (8)$$

Thus, the minimum detectable power is (combining Equations 7 and 8):

$$\Delta P_{min} = P \Delta T / T_o = 3.5 \text{ nW} \quad (9)$$

Silicon photodiodes are available with two to three orders magnitude better noise equivalent power (NEP) and linear dynamic range than what is required. In addition, there is ensured shot-noise-limited operation with 53 μW of background light level. Consequently, the microbend sensor signal-to-noise ratio (S/N) is more than adequate to achieve excellent diaphragm deflection resolution and dynamic range.

Compensation of the microbend sensor is performed to ensure that temperature, vibration, and light level changes do not introduce errors. To compensate the microbend sensor, one of two self-referencing methods is employed in addition to a fiber optic loop for temperature compensation.

Microbend fiber optic pressure transducer outputs may be dc coupled and errors are introduced by random changes in coupling loss when fiber optic connectors are mated, demated, and remated. This random loss results in output signal offset, which can be zeroed out with an adjustment potentiometer in the electronics. However, if cable bending results in similar random offsets, the magnitude of these offsets could lead to random unknown errors. To eliminate these potential offset errors, time domain or wavelength referencing methods are employed.

The time domain referencing preferred embodiment is depicted in FIG. 8. Light from a pulsed source (44) is transmitted to a sensor head (46) containing a fiber optic intensity sensor (48) such as a microbend pressure sensor, delay coil (50) and 2×2 power splitter (52). Each input light pulse is divided at the splitter (52) between the sensor tap (54) and the delay coil tap (56) acting as the reference fiber. The ends of the taps are mirrored (58, 60). If the round trip time through the delay coil (50) is long enough, the received light pulses from the sensor, $I_S$, and delay coil, $I_R$, will be separated in time as shown in FIG. 9. Any cable bending or connector mating and demating introduce offsets which affect the received pulses similarly. Thus, a ratiometric measurement $I_S/I_R$ provides an output signal free of any cable or connector dependent offsets, and free of errors due to fluctuations in the average light level from the source.

Figure 10:
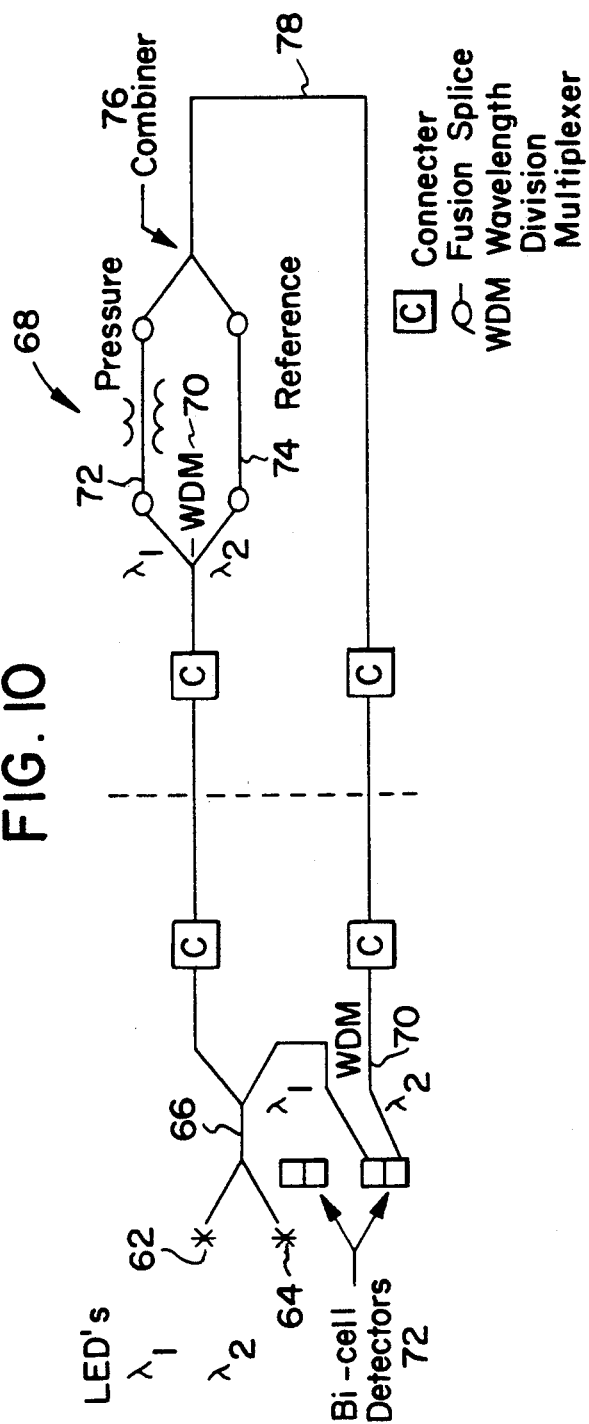
FIG. 10 is a schematic representation of another embodiment employing wavelength division multiplexing.

The wavelength referencing embodiment is shown in FIG. 10. It uses two light sources operating at different wavelengths ($\lambda 1$ and $\lambda 2$). With the dual wavelength approach, the light intensities at each wavelength are combined into a common fiber (66), which travels to the sensor (68) and directly to the detectors (82). A diffraction grating or wavelength division multiplexor (WDM) (70) separates the wavelengths between the signal and reference fibers (72, 74), respectively, in the sensor head (68). The signals are recombined by combiner (76) into an output fiber (78). At the signal processor (80) light intensities at the two wavelengths are separated with another diffraction grating (70) and separately detected in bi-cell detectors (82). To compensate for fluctuations in light levels from each source, it is necessary to monitor the source signals from fiber (66) with one of the cells of the photodetectors and to ratio the sensor signals by the corresponding source signals in log ratio device (84) which transmits the log ratios to difference amplifier (86). The difference in these two ratios is the output, independent of cable and connector dependent offsets and light source fluctuations which is sent to the analog to digital converter (88). Log ratios provide insensitivity to interconnecting cable length.

While both embodiments of FIGS. 8 and 10 employ a reference fiber to compensate for cable and connector offsets, thermal offset has not been corrected.

Figure 12:
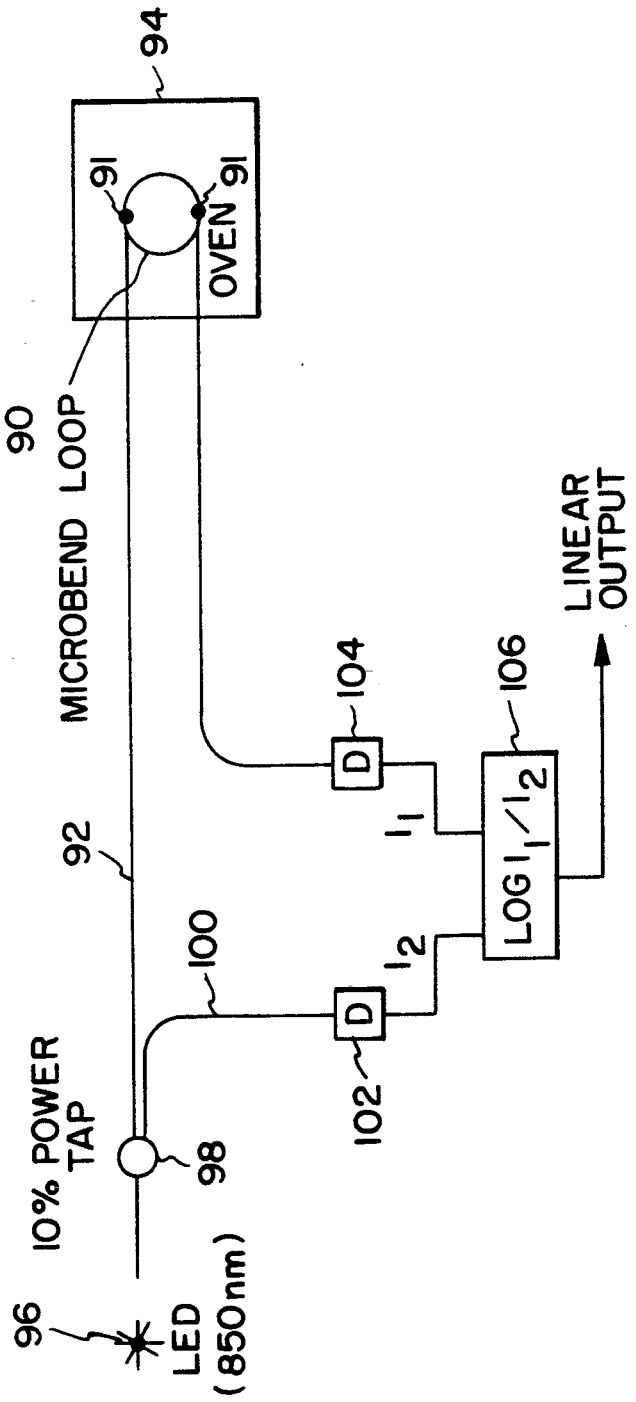
FIG. 12 is a schematic representation of the optical fiber loop temperature sensor.

To compensate for thermal offset of the microbend sensor output, a fiber loop (90) is used, as shown in FIG. 12. An optical fiber (92) is wound in a circular loop (90) of a predetermined radius r. The smaller the loop radius, the greater the light loss through the loop. As light traverses the loop, guided modes in the fiber core are converted to radiation modes in the fiber cladding. This mode conversion occurs because the total internal reflection conditions are not satisfied for the high order guided modes. The mode conversion reduces the amount of light in the fiber core. When the loop is heated, such as in oven (94) or cooled, a combination of thermally-induced changes in fiber core and clad refractive indices and loop radius result in changes in light transmission through the loop. These changes in transmission provide a repeatable change in light output from the loop as a function of temperature.

Figure 13A:
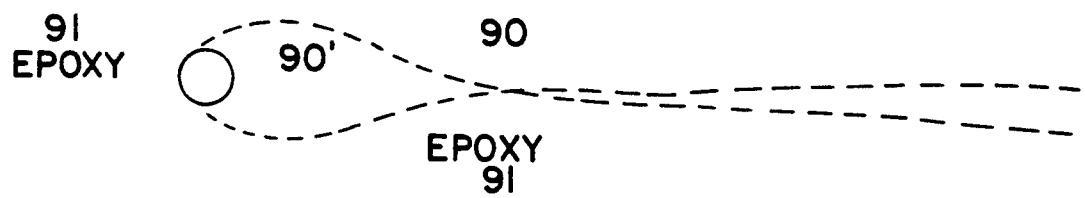
FIGS. 13(a) and 13(b) depict different fiber loop geometries.
Figure 13B:
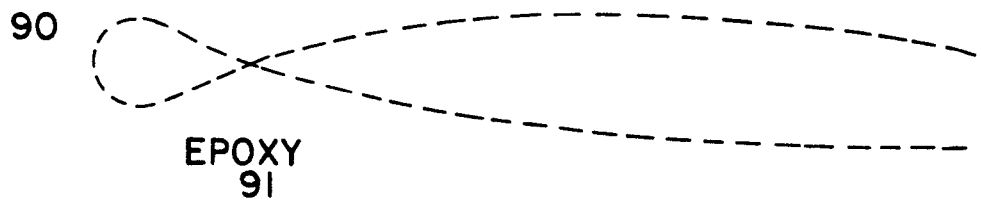

To produce a temperature sensor based on this effect, a section of optical fiber is deformed to produce the desired degree of initial loss in throughput (and thus of temperature sensitivity) and secured with high temperature adhesive or by a mechanically crimped connector at points (91). Typically, the deformed shape is a loop with one or more turns as seen in FIGS. 13(a) and 13(b). As depicted, the fiber optic loop (90) is generally a circular or a teardrop shape. It is envisionable that other shape can produce the same benefits described.

Referring back to FIG. 12, a light source (96) supplies light at a nominal wavelength of 850 nm to sensor fiber (92). A 10% power tap (98) divides the light to supply a reference source intensity along reference fiber (100) directly to detector (102). The signal intensity is transmitted through microbend loop (90) to detector (104). Log ratioes of the signal intensity I, and reference intensity $I_2$ are taken at device (106) to provide a linear output.

FIGS. 13(a) and 13(b) show two different fiber loop (90) geometries. In FIG. 13(a) there is one loop (90') within a larger loop (90). The fiber (90') is secured in two places (91). The lager loop (90) is then secured at one point (91). In FIG. 13(b) there is only one fiber loop (90) fixed at one point (91). Of course, the term loop is meant to include geometries with single, multiple or fractional turns.

FIG. 14 depicts an alternate embodiment employing a single end concept. A light source (108) supplies light to a signal fiber (110). A coupler (112) divides this light to supply detector (114) a reference source intensity via optical fiber (116). The light propagates through the fiber loop (90) until it reaches the end of the signal fiber (110). The end (118) of the signal fiber (110) is mirrored (120) so as to reflect the light back to detector (114) by way of coupler (112). It can be seen that other reflecting means such as Total Internal Reflection, corner cubes of Fresnel reflection can be used.

One such sensor as depicted in FIG. 12 has been fabricated from an aluminum buffer-coated multimode optical fiber with initial loop losses from 1.5 to 5 dB. This sensor has been evaluated from $-55°$ to 230° C. A typical calibration curve for a loop with an initial loss of 4.8 dB is seen in FIG. 15. The throughput is dB is a nearly linear function of temperature over the range tested. Over this range, the sensitivity of this sensor is about $1.1 \times 10^{-3}$ dB/deg C.

Figure 16:
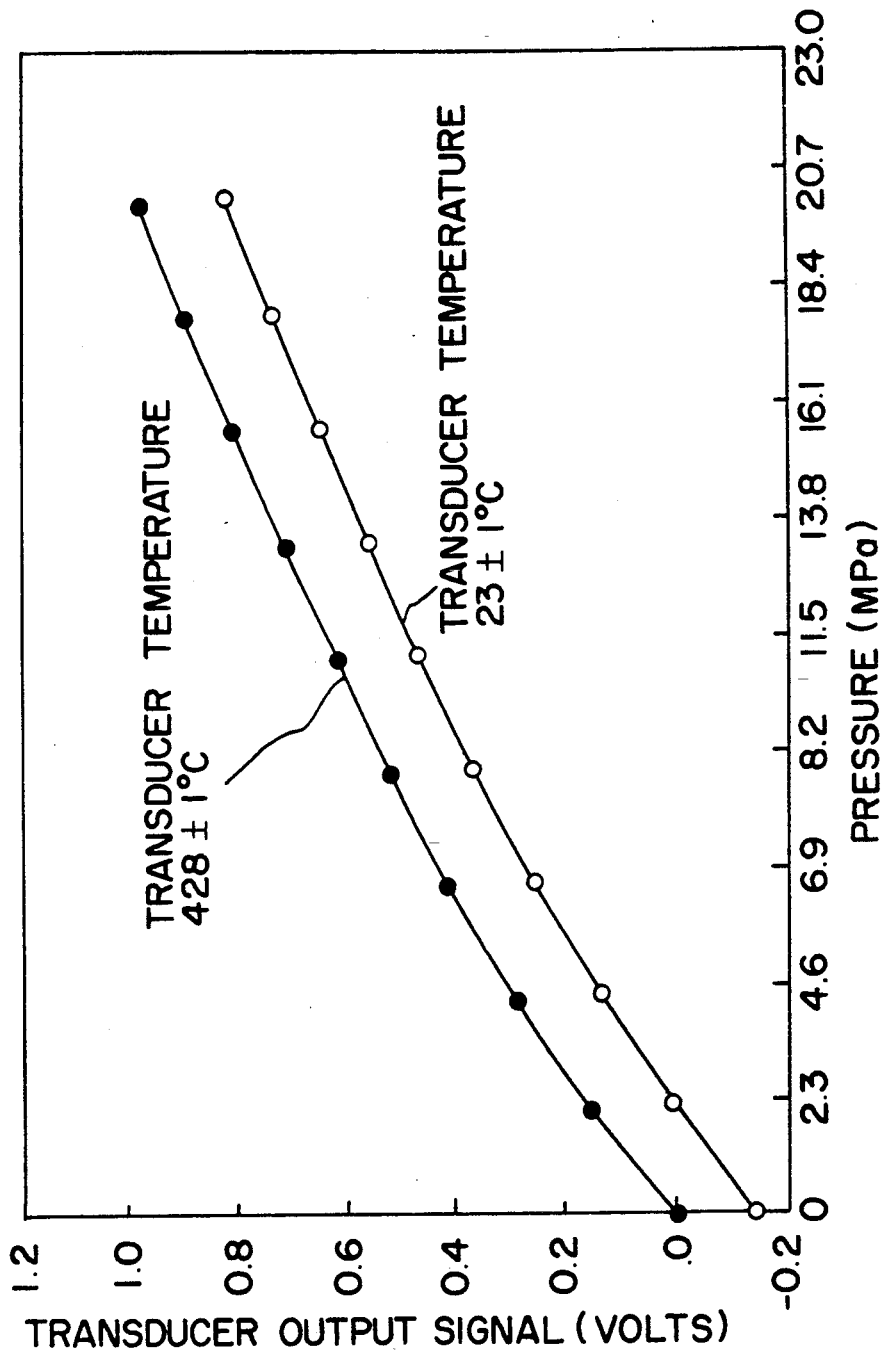
FIG. 16 depicts typical pressure response of a microbend fiber optic transducer at two different temperatures.

The typical pressure response of the microbend fiber optic transducer is seen in FIG. 16, where the transducer output voltage is plotted versus applied pressure at the operating temperature extremes (about 20° C. and about 430° C. nominal). The transducer response at a given temperature exhibits some nonlinearity with applied pressure. The zero-offset between ambient and 430° C. is approximately linear and amounts to $3.3 \times 10^{-4}$/°C. relative to full-scale output. This offset is caused by transducer thermal expansion and change in diaphragm stiffness with temperature. The offset is dB is plotted in FIG. 17 over the temperature range $-60°$ to 80° C.

Figure 11:
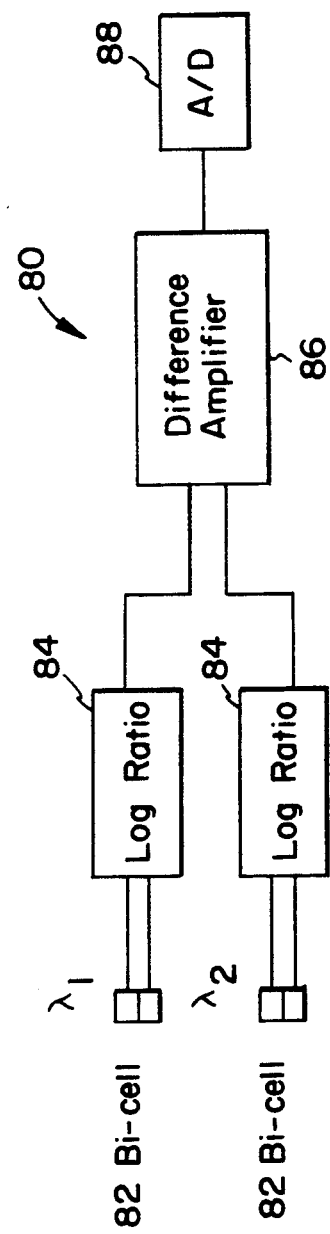
FIG. 11 is a schematic illustration of the signal processing employed in the embodiment depicted in FIG. 10.

Automatic offset compensation of the microbend sensor is performed by optical series addition of the fiber loop signal, which has a positive slope change with temperature (FIG. 15), and the microbend sensor signal, which exhibits a thermal offset with similar but negative slope. This compensation method is realized in the sensor shown in FIG. 11 by connecting the series loop in front of the microbend sensor in the $\lambda_1$ channel after the WDM (70). The reference channel at wavelength $\lambda_2$ then contains only information on connector loss and cable loss, which is the same as in the signal channel at $\lambda_1$. These losses disappear when the electronic difference signal between the two channels is obtained. The slope of the fiber loop signal may be changed by changing the loop radius r. This tuning method provides a way to adjust the loop during manufacture to match the offset of the microbend sensor.

The slope of the thermally induced offset of the microbend sensor signal (FIG. 17) may be made positive by increasing the corrugation spacing. Doubling the corrugation spacing for example from 1.5 to 3 mm, causes the sign of the thermal offset slope to change from negative to positive, but the sensitivity to corrugation displacement is also reduced. In applications where large microbend sensor sensitivity is not needed, advantages in optoelectronic signal processing can be realized.

When the slopes of the microbend sensor thermal offset and fiber loop thermal offset have the same sign, the loop may be placed in the $\lambda_2$ reference leg after the WDM (70) shown in FIG. 10, rather than in the $\lambda_1$ sensor leg as described earlier. In this parallel sensor configuration, the thermal offsets from the microbend sensor and loop are electronically ratioed by the amplifier (86) rather than optically subtracted in the series sensor configuration.

An alternative to the loop temperature sensor is a silicon etalon temperature sensor. This temperature sensor exhibits a thermal offset with negative slope, as shown in FIG. 18. However, the magnitude of this slope is not so easily adjustable compared to the fiber loop. Even so, the silicon etalon provides an alternative method for an independent fiber optic temperature measurement. This independent temperature measurement could then be used to compensate the microbend pressure sensor for thermal offset with a suitable signal processing algorithm such as $P$ = pressure in suitable units
$a_1 \ldots a_6$ = constants
$V_p$ = signal voltage proportional to pressure
$V_T$ = signal voltage proportional to temperature The silicon etalon temperature sensor needs to have its own independent and dedicated optoelectronic self-referencing as shown in FIG. 14.

Interferometric methods are sensitive and versatile for temperature measurement because even slight temperature variations of the components in the optical path are easily detectable by the resulting change in the interference pattern. Fabry-Perot interferometry based on multiple beam interference, can be readily employed as a fiber optic temperature sensor by depositing a thin film of silicon instead of the mirror (120) on the end (118) of an optical fiber as best illustrated in FIG. 14. This film acts as a thin semiconductor etalon.

In practice, a silicon thin film less then one wavelength thick is deposited on the end of an optical fiber, creating a glass/silicon interface and a silicon/air interface. Light launched into the fiber is reflected from both of these interfaces forming the returning beam. The intensities and relative phase of multiple reflections between these interfaces determine the intensity of the returned beam. Any changes in the refractive index or physical dimensions of the etalon results in a change in the relative phase, and thus in the returned intensity. These temperature-induced intensity changes are readily measured with straightforward optoelectronics.

Reflective mode (single-ended) silicon etalon temperature sensors have been fabricated and tested with silicon film thicknesses between 400 and 800 nm. The silicon etalons were deposited directly on the polished optical fiber ends using RF sputtering. The resulting sensors have been tested over a temperature range of $-65°$ F. to 800° F. A typical calibration curve obtained is shown in FIG. 17. As this figure above, the relationship between temperature and light intensity throughput is nonlinear, but repeatable. Use of a Fabry-Perot etalon as a temperature sensor results in a very compact sensor, since the only components are the optical fiber and the silicon thin film. Even when encased in a protection tube, the sensor is comparable in size and form factor to small sheathed thermocouples. The sensor thus has a very low thermal mass and correspondingly small time constant. This type of sensor is simple to fabricate and is very rugged. The etalons tested produce relatively large signal changes with temperature: on the order of $4 \times 10^{-3}$ dB/deg C. over a range of $-60°$ to 400° C., resulting in excellent resolution capability.

The etalon sensor is inherently single-ended; while this provides the advantage of compactness, it results in a penalty in the loss budget. With a conventional 3 dB power splitter, this penalty is typically 9 to 10 dB, with an additional 2 to 3 dB at the film itself. In addition, the returned intensity is inherently nonlinear and the nonlinearity is a function of the film thickness, thus requiring a high degree of control in the deposition process to achieve sensor to sensor repeatability. The sensor returned intensity is sensitive to changes in the source wavelength; with a typical 830 nm LED with a temperature coefficient of 0.3 nm/deg C., temperature induced wavelength changes in the LED result in a sensitivity of about $8.7 \times 10^{-3}$ dB/deg C. This requires that the LED temperature be held constant within a small range or that the LED temperature or center wavelength be independently measured and a correction performed in the signal processing. This introduces undesirable additional complexity into the signal processing electronics.

While specific embodiments of the present invention have been shown and described in detail to illustrate the application and principles of the invention, it will be understood that it is not intended that the present invention be limited thereto and that the invention may be embodied otherwise without departing from such principles.

What is claimed is:

1. A temperature compensated, self-referenced fiber optic sensor, comprising:

a pair of plates with corrugated surfaces having facing and offset teeth, at least one of said plates being in contact with a parameter to be sensed;

a first signal optical fiber clamped between said corrugated plates for being bent to a greater or less extent depending on a parameter exerted on said corrugated plates;

a second reference optical fiber located adjacent said plates to be exposed to a similar environment, said second reference optical fiber being formed in a loop with at least one turn and secured to itself by at least one point with securing means, said optical fiber loop having a predetermined radius r constructed to produce a controlled degree of microbending loss for mode conversion to compensate for thermal offset in addition to cable and connector offsets and light source fluctuations;

a light source for supplying light to said signal and reference optical fibers; and optical detecting means for receiving light from said signal and reference optical fibers, said optical detecting means measuring changes in transmitted light therethrough for determining a sensed parameter, said optical detecting means further including light transmission determining means for measuring a change in transmission in said reference fiber to compensate for thermal offset in the sensed parameter.

2. A temperature compensated, self-referenced fiber optic sensor, comprising:

a pair of plated with corrugated surfaces having facing and offset tooth, at least one of said plates being in contact with a parameter to be sensed;

a first signal optical fiber clamped between said corrugated plates for being bent to a greater or less extent depending on a parameter exerted on said corrugated plates, said signal fiber having an optical fiber loop situated past said corrugated plates, said optical fiber loop having a predetermined radius r with at least one turn and secured to itself with securing means, said optical fiber loop being constructed to produce a controlled degree of microbending loss for mode conversion to compensate for thermal offset;

a second reference optical fiber located adjacent said plates to be exposed to a similar environment;

a light source for supplying light to said signal and reference optical fibers; and optical detecting means for receiving light from said signal and reference optical fibers, said optical detecting means measuring changes in transmitted light therethrough for determining a sensed parameter, said optical detecting means further including light transmission determining means for measuring a change in transmission in said reference fiber to compensate for thermal offset in the second parameter.

3. A fiber optic sensor as recited in claim 1, further comprising:

a second light source for supplying light at a second wavelength $\lambda_2$ together with said first light source supplying light at a first wavelength $\lambda_1$, said light at the first wavelength $\lambda_1$ being supplied to said signal optical fiber and said light at the second wavelength $\lambda_2$ being supplied to said reference optical fiber; and optical detecting means including at least two photodetectors for receiving light intensities at the two wavelengths from said signal and reference fibers to produce corresponding output signals, and optical detecting means further receiving light intensities directly from said first and second light sources to provide source signals at both wavelengths, said optical detecting means comparing said output signals with source signals to determine the sensed parameter.

4. A fiber optic sensor as recited in claim 2, further comprising:

a second light source for supplying light at a second wavelength $\lambda_2$ together with said first light source supplying light at a first wavelength $\lambda_1$, said light at the first wavelength $\lambda_1$ being supplied to said signal optical fiber and said light at the second wavelength $\lambda_2$ being supplied to said reference optical fiber; and optical detecting means including at least two photodetectors for receiving light intensities at the two wavelengths from said signal and reference fibers to produce corresponding output signals, said optical detecting means further receiving light intensities directly from said first and second light sources to provide source signals at both wavelengths, said optical detecting means comparing said output signals with source signals to determine the sensed parameter.

5. A fiber optic sensor, as recited in claim 1, wherein said reference fiber includes a delay coil to create a separation in time of light intensity, said light source being pulsed to provide pulses of light for separation.

6. A fiber optic sensor, as recited in claim 2, wherein said reference fiber includes a delay coil to create a separation in time of light intensity, said light source being pulsed to provide pulses of light for separation.

7. A fiber optic sensor, as recited in claim 5, wherein said optical detecting means provides a ratiometric measurement of signal fiber intensity to reference fiber intensity based upon time domain intensity.

8. A fiber optic sensor, as recited in claim 6, wherein said optical detecting means provides a ratiometric measurement of signal fiber intensity to reference fiber intensity based upon time domain intensity.

9. A temperature compensated, self-referenced fiber optic sensor, comprising:

a pair of plates with corrugated surfaces having facing and offset teeth, at least one of said plates being in contact with a parameter to be sensed, one plate of said pair of plates being positioned centrally on a diaphragm which deflects in proportion to a pressure difference, said other plate being opposite and offset thereof, said diaphragm being circumferentially sealed inside a cap and body;

a first signal optical fiber clamped between said corrugated plates for being bent to a greater or less extent depending on a parameter exerted on said corrugated plates;

a second reference optical fiber located adjacent said plates to be exposed to a similar environment, said second reference optical fiber being formed in a loop with at least one turn and secured to itself by at least one point with securing means, said optical fiber loop having a predetermined radius r constructed to produce a controlled degree of microbending loss for mode conversion to compensate for thermal offset in addition to cable and connector offsets and light source fluctuations;

a light source for supplying light to said signal and reference optical fibers; and optical detecting means for receing light from said signal and reference optical fibers, said optical detecting means measuring changes in transmitted light therethrough for determining a sensed parameter, said optical detecting means further including light transmission determining means for measuring a change in transmission in said reference fiber to compensate for thermal offset in the sensed parameter.

10. A fiber optic sensor as recited in claim 9, wherein said cap includes an aperture for producing a vacuum within the body.

11. A fiber optic sensor as recited in claim 10, wherein said body includes a greater for absorbing outgassed and in-diffused gases for maintaining the vacuum.

12. A temperature compensated, self-referenced fiber optic sensor, comprising:
   a pair of plates with corrugated surfaces having facing and offset teeth, at least one of said plates being in contact with a parameter to be sensed;
   a first signal optical fiber clamped between said corrugated plates for being bent to a greater or less extent depending on a parameter exerted on said corrugated plates;
   a second reference optical fiber located adjacent said plates to be exposed to a similar environment, said second reference optical fiber being formed in a loop with at least one turn and secured to itself by at least one point with securing means, said optical fiber loop having a predetermined radius r constructed to produce a controlled degree of microbending loss for mode conversion to compensate for thermal offset in addition to cable and connector offsets and light source fluctuations;
   a light source for supplying light to said signal and reference optical fibers; and
   optical detecting means for receiving light from said signal and reference optical fibers, said optical detecting means measuring changes in transmitted light therethrough for determining a sensed parameter, said optical detecting means further including light transmission determining means for measuring a change in transmission in said reference fiber to compensate for thermal offset in the sensed parameter, said optical fiber loop including one end of the optical fiber forming the loop having reflecting means at or near the point of being secured, said reflecting means reflecting light supplied to the optical fiber back to said optical detecting means.

13. A fiber optic sensor as recited in claim 3, wherein said optical detecting means provides a ratiometric measurement of signal fiber intensity to reference fiber intensity based upon wavelength domain intensity.

14. A fiber optic sensor as recited in claim 4, wherein said optical detecting means provides a ratiometric measurement of signal fiber intensity of reference fiber intensity based upon wavelength domain intensity.

15. A temperature compensated, self-referenced fiber optic sensor, comprising:
   a pair of plates with corrugated surfaces having facing and offset teeth, at least one of said plates being in contact with a parameter to be sensed, one plate of said pair of plates being positioned centrally on a diaphragm which deflects in proportion to a pressure difference said other plate being opposite and offset thereof, said diaphragm being circumferentially sealed inside a cap and body;
   a first signal optical fiber clamped between said corrugated plates for being bent to a greater or less extent depending on a parameter exerted on said corrugated plates, said signal fiber having an optical fiber loop situated past said corrugated plates, said optical fiber loop having a predetermined radius r with at least one turn and secured to itself with securing means, said optical fiber loop being constructed to produce a controlled degree of microbending loss for mode conversion to compensate for thermal offset;
   a second reference optical fiber located adjacent said plates to be exposed to a similar environment;
   a light source for supplying light to said signal and reference optical fiber; and
   optical detecting means for receiving light from said signal and reference optical fibers, said optical detecting means measuring changes in transmitted light therethrough for determining a sensed parameter, said optical detecting means further including light transmission determining means for measuring a change in transmission in said reference fiber to compensate for thermal offset in the sensed parameter.

16. A fiber optic sensor as recited in claim 15, wherein said cap includes an aperture for producing a vacuum within the body.

17. A fiber optic sensor as recited in claim 16, wherein said body includes a getter for absorbing outgassed and in-diffused gases for maintaining the vacuum.

18. A fiber optic sensor as recited in claim 2, wherein said optical fiber loop includes one end of the optical fiber forming the loop having reflecting means at or near the point of being secured, said reflecting means reflecting light supplied to the optical fiber back to said optical detecting means.

19. A fiber optic sensor as recited in claim 12, wherein said reflecting means includes a silicon film deposited on one end of the optical fiber forming the loop.

* * * * *